US009151921B2

(12) United States Patent
    Diatzikis

(10) Patent No.: US 9,151,921 B2
(45) Date of Patent: Oct. 6, 2015

(54) APPARATUS FOR MAKING UNIFORM OPTICAL FIBER BUNDLES IN POWER GENERATORS

(71) Applicant: Siemens Energy, Inc., Orlando, FL (US)

(72) Inventor: Evangelos V. Diatzikis, Chuluota, FL (US)

(73) Assignee: Siemens Energy, Inc., Orlando, FL (US)

( * ) Notice: Subject to any disclaimer, the term of this patent is extended or adjusted under 35 U.S.C. 154(b) by 0 days.

(21) Appl. No.: 14/179,747

(22) Filed: Feb. 13, 2014

(65) Prior Publication Data

US 2015/0226929 A1    Aug. 13, 2015

(51) Int. Cl.
    *G02B 6/00*    (2006.01)
    *G02B 6/44*    (2006.01)

(52) U.S. Cl.
    CPC .................... *G02B 6/4457* (2013.01)

(58) Field of Classification Search
    CPC .. G02B 6/4457; G02B 6/4452; G02B 6/4454; G02B 6/4455
    USPC ........................................... 385/12, 134, 135
    See application file for complete search history.

(56) References Cited

U.S. PATENT DOCUMENTS

| 4,722,585 | A  | * | 2/1988  | Boyer .......................... 385/135 |
| 4,735,480 | A  | * | 4/1988  | Levinson et al. ............... 385/58 |
| 5,477,871 | A  | * | 12/1995 | Sanchez, Jr. .................. 132/323 |
| 6,243,526 | B1 | * | 6/2001  | Garibay et al. ............... 385/135 |
| 6,483,033 | B1 | * | 11/2002 | Simoes et al. ............... 174/72 A |
| 7,548,679 | B2 | * | 6/2009  | Hirano et al. ................. 385/134 |
| 7,594,909 | B2 | * | 9/2009  | Mogensen et al. ............ 604/500 |
| 7,839,252 | B2 | * | 11/2010 | Heinrich et al. .............. 336/198 |
| 8,602,658 | B2 | * | 12/2013 | Hopmann et al. .............. 385/55 |
| 8,818,157 | B2 | * | 8/2014  | Burek et al. .................. 385/135 |
| 2002/0097966 | A1 | * | 7/2002 | Zelesnik ....................... 385/100 |
| 2003/0059192 | A1 | * | 3/2003 | Johnson ........................ 385/135 |
| 2003/0142938 | A1 | * | 7/2003 | Koyano et al. ................ 385/123 |
| 2009/0324188 | A1 | * | 12/2009 | Berglund et al. ............. 385/135 |
| 2012/0026482 | A1 | * | 2/2012 | Dailey ........................... 356/43 |
| 2012/0099826 | A1 | * | 4/2012 | Donaldson et al. .......... 385/135 |

\* cited by examiner

*Primary Examiner* — Ellen Kim

(57) ABSTRACT

A circular fiber hoop for supporting one or more fiber optic cables, especially fiber optic cables for an optical sensor provided within a pressurized enclosure of a power generator. The fiber hoop is a single piece member including a center mandrel positioned between opposing side guards. The fiber optic cable is wound around the mandrel between the side guards. An end of the fiber optic cable including the sensor is optically coupled through a union connector to another optical fiber, where the union connector is mounted to one of the side guards so that it is separated from the wound mass of the fiber cables. The wound mass of the fiber cable on the mandrel is then enclosed in a suitable tape.

19 Claims, 4 Drawing Sheets

APPARATUS FOR MAKING UNIFORM OPTICAL FIBER BUNDLES IN POWER GENERATORS

BACKGROUND OF THE INVENTION

1. Field of the Invention

This invention relates generally to a fiber hoop for supporting an optical fiber bundle and, more particularly, to a single piece, circular fiber hoop including a center mandrel and opposing side guards, where fiber optic cables are wound on the mandrel and optical connectors are mounted to the side guards, and where the fiber hoop has particular application for fiber optic cables providing optical signals for sensors in a power generator.

2. Discussion of the Related Art

High voltage generators for generating electricity as a power source are well known in the art. A power plant may include a gas turbine engine that rotates a shaft by combusting fuel and air in a combustion chamber to generate a working gas that expands across blades that rotate, and in turn causes the shaft to rotate. The shaft of such an engine is coupled to an input shaft of a high voltage generator that is mounted to a rotor having a special configuration of coils. An electrical current provided in the rotor coils generates a magnetic flux around the coils, and as the rotor rotates, the magnetic flux interacts with windings in a stator core enclosing the rotor, which generates a current flow in the windings A typical high voltage generator includes an outer housing or frame comprised of structural steel including an internal bore in which the stator core and rotor are mounted. Often times, the outer frame is filled with hydrogen and pressurized for operation of the generator, where the pressurized hydrogen provides a good environment for cooling purposes. The stator core is typically a stacked assembly of several thousand laminate rings of a relatively thin ferrous material, such as iron or steel A group of the laminations are formed together during assembly of the generator and slid onto construction bolts extending along an inside surface of the internal bore of the frame The rotor is then rotatably mounted within the laminate rings It is critical that sensors are provided within the pressurized environment of the outer frame of a high voltage generator to measure operating conditions and detect failures. For example, a typical high voltage generator may include eight suitable sensors providing measurements for vibration, temperature, strain, etc.

In modern high power generators, these measurements are typically obtained using optical sensors, such as fiber Bragg grating (FBG) sensors, Rayleigh scattering sensors, etc, that employ a fiber optic cable. The analyzing devices that monitor the optical signals from the sensors are external to the generator frame and thus it is necessary to provide a penetration including a pressure seal at a suitable location within the frame through which the fiber optic cables can exit the frame without effecting the pressure environment therein. In one known design, the fiber optic cable including the sensor, sometimes referred to herein as a sensor cable, is optically coupled to another fiber optic cable, sometimes referred to herein as an analyzer cable, through a suitable fiber optic coupler within the pressure environment of the frame, where it is the analyzer cable that extends through the penetration and pressure seal to be coupled to the analyzing device. An end of the fiber optic cable including the optical sensor is positioned at the location where it is desired to take the particular measurement, and then the fiber is routed within the frame in a strategic manner so that it is less likely to be damaged to a location where the pressure seal is provided to gain access outside of the generator.

The fiber optic cable including the sensor is provided by the manufacturer of the sensor and comes in a set length, such as seven meters Typically, that length of the sensor cable is significantly longer than what is required to provide the optical sensor at the sensing location and optically coupled to the analyzer fiber at the location of the pressure seal Because it is not practical to have an installer reduce the length of the sensor fiber cable during assembly of the power generator, various techniques are employed in the art to bundle the optical fiber to confine the excess length of the cable.

In one known bundling technique, the excess fiber optic cable is freely wound into a loop having a diameter, for example, of 8-10 inches, so that bending of the fiber does not significantly affect the propagation of the optical signal therein. Particularly, once all of the fiber optic cables have been routed to the pressure seal location, then the installer will freely wind the excess fiber length of all of the fiber optic cables into a single free loop. The loop is then enclosed in a protective coating of a suitable material and is mounted to an inside wall of the frame. Requiring the installer to freely loop the excess fiber optic cables typically creates inconsistencies from loop to loop sometimes resulting in optical losses in the fiber as a result of loop configuration. Particularly, as the installer wraps the fibers into the loop, optical losses as a result of the fiber being bent typically occur, where those losses are not consistent from one loop to the next loop

SUMMARY OF THE INVENTION

The present disclosure describes a circular fiber hoop for supporting one or more fiber optic cables, especially fiber optic cables for optical sensors provided within a pressurized enclosure of a power generator The fiber hoop is a single piece member including a center mandrel positioned between opposing side guards. The fiber optic cable is wound around the mandrel between the side guards An end of the fiber optic cable including the sensor is optically coupled through a union connector to another optical fiber, where the union connector is mounted to one of the side guards so that it is separated from the wound mass of the fiber cables. The wound mass of the fiber cables on the mandrel is then enclosed in a suitable tape.

Additional features of the present invention will become apparent from the following description and appended claims, taken in conjunction with the accompanying drawings.

DETAILED DESCRIPTION OF THE EMBODIMENTS

Figure 1:
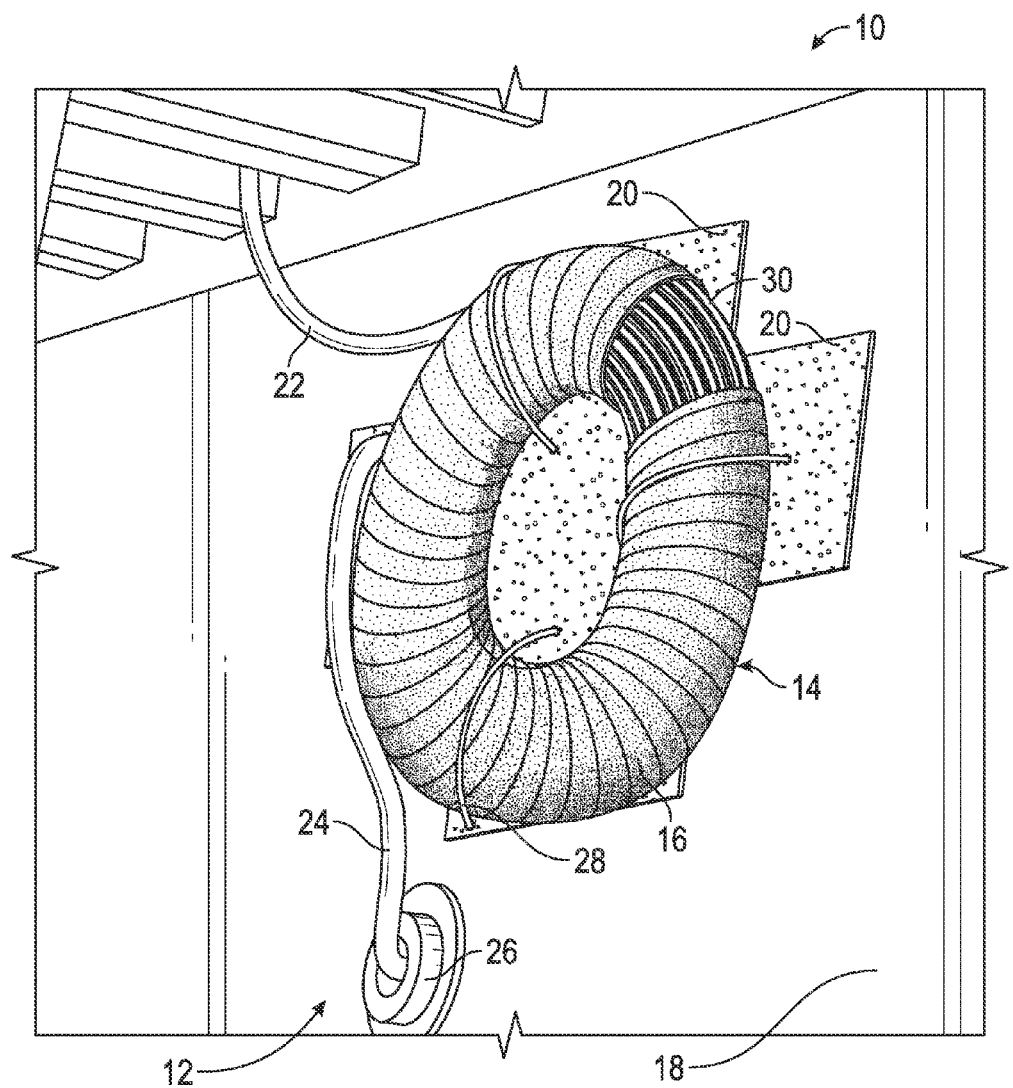
FIG. 1 is a cut-away isometric view of a portion of a generator frame including a loop of fiber optic cables mounted to an inside wall of the frame.

The following discussion of the embodiments of the invention directed to a fiber hoop for supporting a fiber optic cable associated with a sensor in a power generator is merely exemplary in nature, and is in no way intended to limit the invention or its applications or uses For example, the fiber hoop discussed below may have application for supporting fiber optic cables for other systems FIG. 1 is a cut-away isometric view of a portion of an external housing or frame 10 for a power generator having a side wall 12. A fiber loop 14 including a mass of wound fiber optic cables 30 wrapped in Teflon tape 16 is mounted to an inside surface 18 of the wall 12 by Dacron mounting straps 20. The wound fiber optic cables include sensor cables for a number of optical sensors (not shown), where each of the sensor fiber optic cables extend within the power generator to a location where the sensor measurement is desired. The sensor cables are bound together proximate the fiber loop 14 and are identified as fiber cables 22. The sensor fiber optical cables 22 are each separately coupled to an analyzing fiber optic cable by a union connector (not shown), where the analyzing fiber cables are bound together and represented by cables 24. The cables extend through a penetration opening 26 in the wall 12 including a pressure seal (not shown). The union connectors are enclosed within the Teflon tape 16 and as such are not accessible. During assembly, the Dacron straps 20 are immersed in a suitable epoxy prior to being affixed to the wall 12. While the epoxy is in the viscous state, the fiber loop 14 is mounted against the Dacron straps 20 and is tied thereto by strings 28. Once the epoxy hardens, the fiber loop 14 is rigidly secured to the wall 20 in a manner suitable for the high pressure and high vibration environment of the power generator Although the technique as just described is suitable for securing excess fiber lengths in a power generator, inconsistencies in the ability to wind the fiber loop 14 with minimal light loss as described above can be improved.

Figure 2:
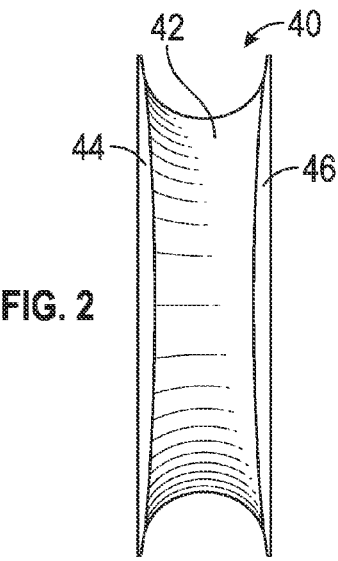
FIG. 2 is a top view of a fiber hoop for supporting a fiber optic cable.
Figure 3:
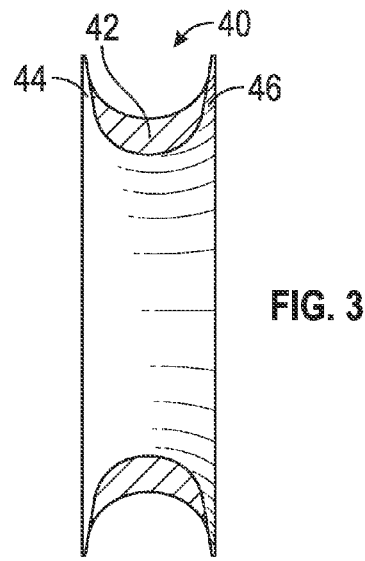
FIG. 3 is a cross-sectional view of the fiber hoop shown in FIG. 2.
Figure 4:
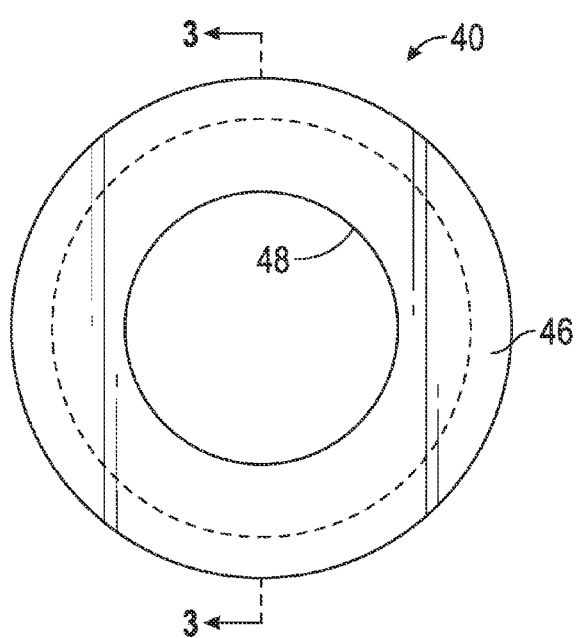
FIG. 4 is a side view of the fiber hoop shown in FIG. 2.

The present invention proposes a support device suitable for the high pressure power generating environment on which the sensor fiber optic cables can be wound in a consistent and repeatable manner so as to provide reduced and consistent light loss in the fiber cables. FIG. 2 is a top view, FIG. 3 is a cross-sectional view and FIG. 4 is a side view of a circular fiber hoop 40 including a curved center mandrel 42 positioned between opposing side guards 44 and 46, where the mandrel 42 and the side guards 44 and 46 define a central opening 48. In one embodiment, the fiber hoop 40 is a single piece plastic member formed by a suitable molding process, where the plastic is sufficiently hard and rigid and is chemically resistant to the various oils, hydrogen and other materials and contaminants that may exist inside the pressurized power generation environment. The height of the side guards 44 and 46 is selected to be optimal for the length of the fiber cable or cables that need to be wound on the mandrel 42 The mandrel 42 has a general U-shaped configuration so that it effectively flows into the inside surface of the side guards 44 and 46 Although plastic has been suggested as the preferred material for the fiber hoop 40, other dielectric and non-conductive materials may be applicable.

As will be discussed in further detail below, one or more fiber optic cables are wound around the mandrel 42 in a manner that limits the loss of light propagating in the fiber optic cable, which could occur as a result of bending of the cable In one embodiment, the diameter of the mandrel 42 of the hoop 40 is 10 inches to meet this requirement However, as will be appreciated by those skilled in the art, the diameter of the fiber hoop 40 can be any suitable diameter so that it fits within a desirable mounting location within the generator frame 10 and does not cause the wound fiber cables to exceed a desired light loss. The fiber optic cable may be wound around the mandrel 42 a number of times, where each loop of the fiber cable provides a defined amount of light loss. If the number of the loops and the defined amount of light loss exceeds some predetermined unacceptable amount of light loss, then the size of the hoop 40 may need to be increased.

Figure 5:
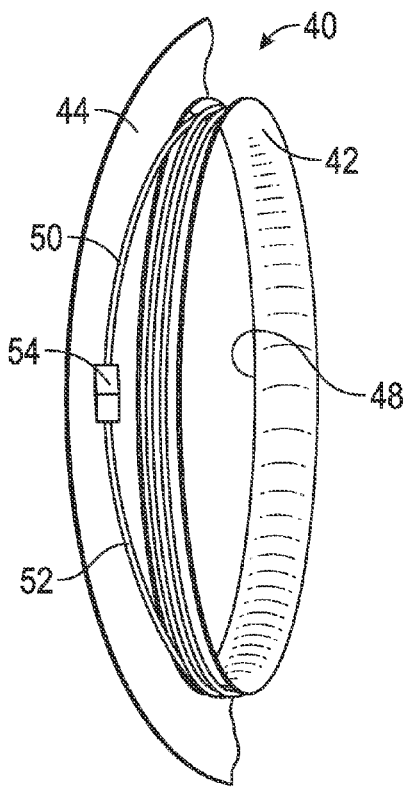
FIG. 5 is a cut-away, isometric view of the fiber hoop shown in FIG. 2 and including a fiber optic cable wound thereon.

FIG. 5 is a cut-away isometric view of the fiber hoop 40 showing a sensor fiber optic cable 50 and an analyzer fiber optic cable 52 wrapped around the mandrel 42 As mentioned above, the sensor fiber cable 50 would include the fiber sensor positioned at some location within the power generator and would be coupled to the analyzer fiber cable 52 proximate the opening 26 The cables 50 and 52 are coupled together by a fiber coupler 54, which can be a standard union connector According to the invention, the fiber coupler 54 is not tightly wrapped around the mandrel 42, but is raised above the mandrel 42 and secured to an inside surface of one of the side guards 44 or 46, here the side guard 44. The fiber coupler 54 can be secured to the side guard 44 in any suitable manner, for example, by Teflon tape By separating the fiber coupler 54 from the wound bulk of the cables 50 and 52, access to the fiber coupler 54 can be more readily provided so that if the cables 50 and 52 need to be disconnected for trouble shooting purposes or otherwise, this can be done in a more cost effective manner It is noted that although FIG. 5 shows the cables 50 and 52 for a single fiber sensor, the fiber hoop 40 is configured to accept the fiber optic cables for multiple fiber sensors where the particular fiber coupler for each of the sensors can be strategically positioned around the circumference of the side guard separated from the other fiber couplers in any suitable manner.

Figure 6:
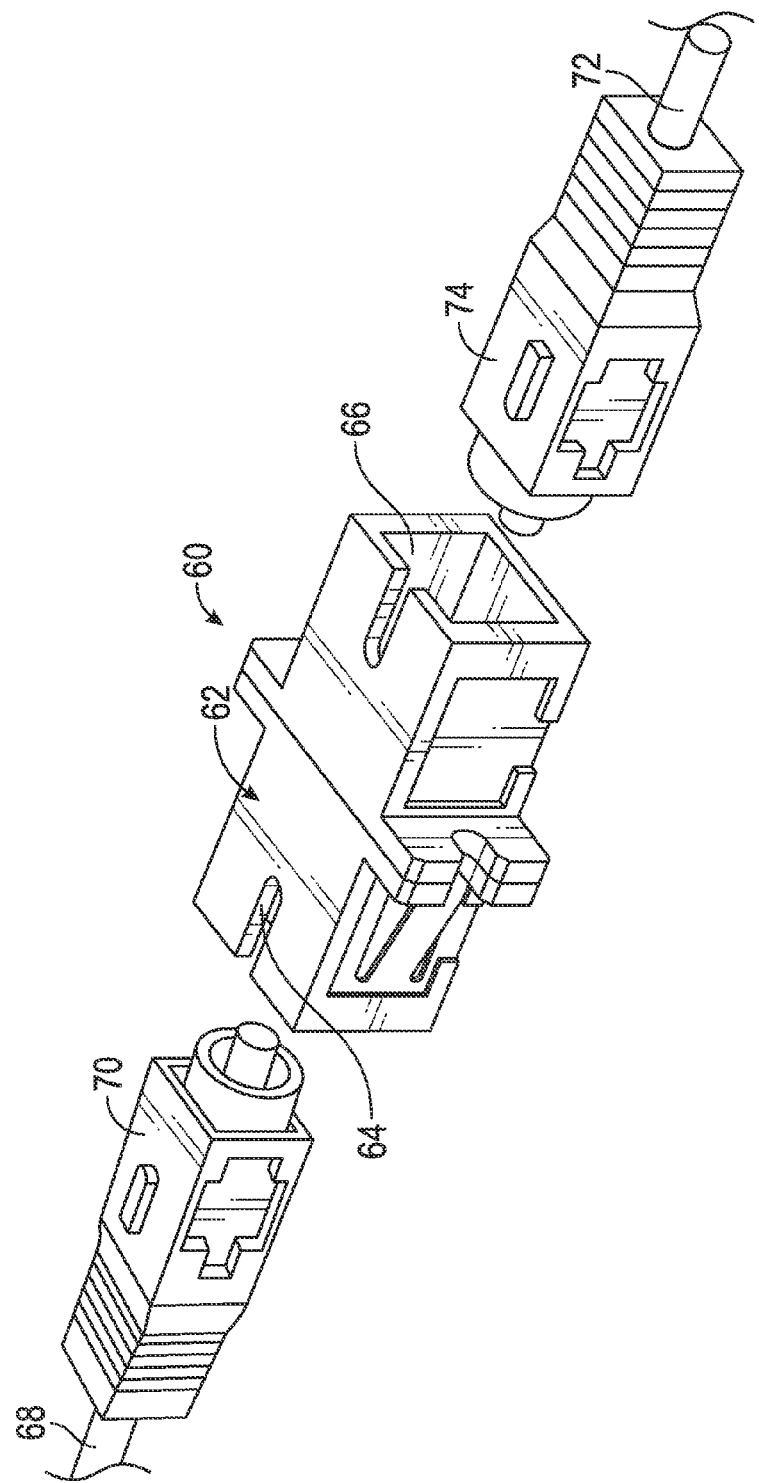
FIG. 6 is an exploded view of two fiber optic cables being coupled to a union connector.

FIG. 6 is an exploded view of an optical assembly 60 showing a typical optical connection for two fiber optic cables that can be suitable for the fiber coupler 54 and the fiber optic cables 50 and 52 The optical assembly 60 includes a union connector 62 having opposing female ports 64 and 66. A first fiber optic cable 68 including a male connector 70 is inserted into the female port 64 and a second fiber optic cable 72 including a male connector 74 is inserted in the female port 66 to make an optical connection between the cables 68 and 72.

Figure 7:
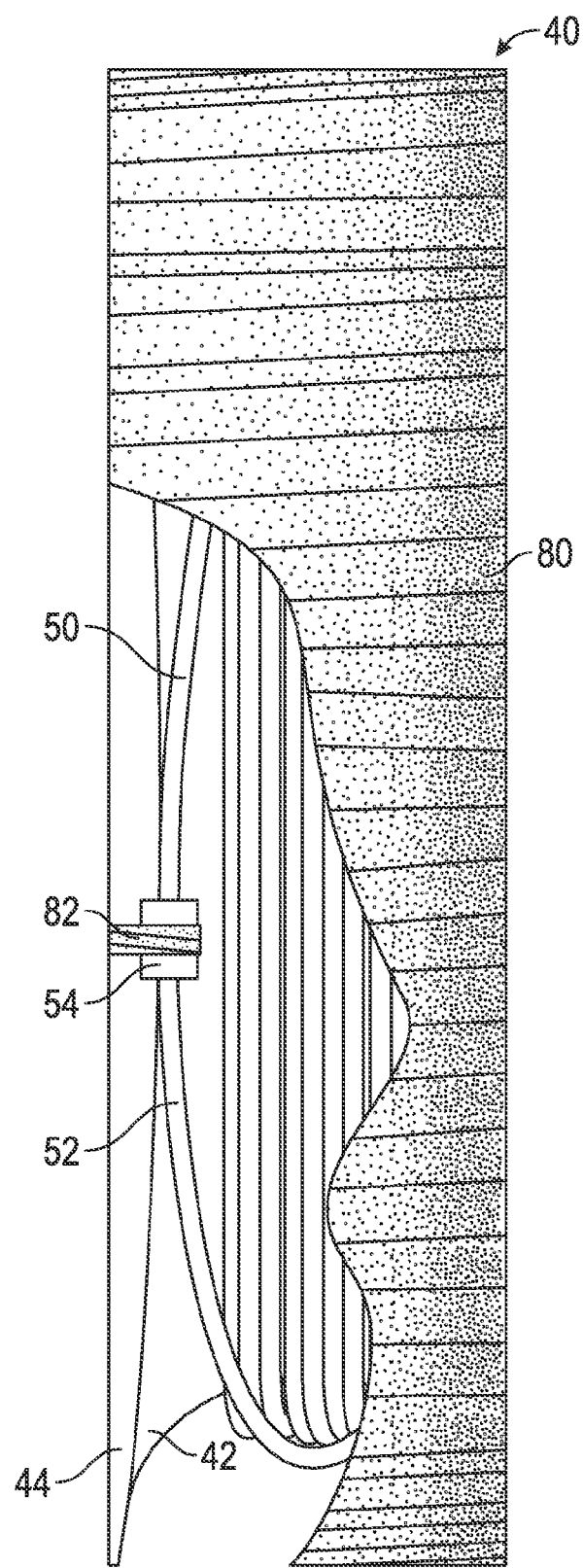
FIG. 7 is the top view of the fiber hoop shown in FIG. 2 including a fiber optic cable wound thereon and enclosed by tape.

Once the fiber optic cables 50 and 52, and the other fiber optic cables for the other sensors if provided, are wound on the mandrel 42, then those fiber optic cables are covered with a suitable covering, such as a Teflon tape. FIG. 7 is a top view of the final assembled fiber hoop 40 separated from the wall 12, where the mass of fiber optic cables are enclosed by winding Teflon tape 80 through the opening 48 over the top of the side guards 44 and 46 all the way around the circumference of the hoop 40. FIG. 7 is cut-away to show the fiber coupler 54 secured to the inside surface of the side wall 44 by a separate piece of tape 82. Once the fiber hoop 40 is wrapped with the Teflon tape 80 and all of the fiber cables are secured around the mandrel 42, the fiber hoop 40 is then secured to the wall 12 of the generator frame 12 using the Dacron straps 20 in the same manner as discussed above for the fiber loop 14.

The foregoing discussion discloses and describes merely exemplary embodiments of the present invention. One skilled in the art will readily recognize from such discussion, and from the accompanying drawings and claims, that various changes, modifications and variations can be made therein without departing from the scope of the invention as defined in the following claims.

What is claimed is:

1. A fiber hoop comprising a single piece plastic member having a circular shape including a central circular opening defining a continuous outer perimeter piece, said outer perimeter piece including a center mandrel configured to accept wound strands of one or more fiber optic cables and two opposing side guards raised away from the mandrel from the central opening, said side guards being configured to hold the one or more fiber optic cables on the mandrel and to hold a fiber coupler such that the fiber coupler is raised above the wound strands of the fiber optic cable and the fiber coupler is secured to an inside surface of one of the side guards.

2. The fiber hoop according to claim 1 wherein the fiber hoop has a diameter of about 10 inches at the mandrel.

3. The fiber hoop according to claim 1 wherein the fiber coupler couples a sensor fiber optic cable including a sensor at an opposite end of the sensor fiber optic cable from the coupler and an analyzer fiber optic cable where a portion of both the sensor fiber optic cable and the analyzer fiber optic cable are wound around the mandrel.

4. The fiber hoop according to claim 3 wherein the sensor fiber optic cable is positioned within a power generator.

5. The fiber hoop according to claim 4 wherein the fiber hoop is configured to be mounted to an inside surface of a wall of a generator frame.

6. The fiber hoop according to claim 5 wherein the fiber hoop is secured to the wall by an epoxy.

7. The fiber loop hoop according to claim 5 wherein the fiber hoop is mounted to the wall proximate to a pressure sealed penetration through the wall.

8. The fiber hoop according to claim 1 wherein the fiber hoop is wrapped with tape wound through the opening and around top edges of the side guards.

9. The fiber hoop according to claim 1 wherein the mandrel is a curved mandrel having edges that raise up toward the side guards.

10. The fiber hoop according to claim 1 wherein the fiber coupler is secured to the side guard by tape.

11. The fiber hoop according to claim 1 wherein the fiber coupler is a union connector.

12. A fiber hoop effective to hold wound strands of one or more fiber optic cables and be secured to an inside surface of a frame for a power generator, where the wound strands of the fiber optic cables include a sensor fiber optic cable having a sensor positioned within the generator frame and an analyzer fiber optic cable coupled to the sensor fiber optic cable and extending through a pressure sealed opening in the frame, said fiber hoop comprising a circular perimeter member including a circular opening therein, said circular perimeter member including a mandrel on which the strands of the one or more fiber optic cables are wound and opposing side guards on opposite sides of the mandrel, wherein the sensor fiber cable and the analyzer fiber cable are coupled together by a fiber optical coupler and wherein the fiber coupler is secured to one of the side guards by tape such that the fiber coupler is held in a position that is raised above the wound strands.

13. The fiber hoop according to claim 12 wherein the perimeter member is a single piece plastic member.

14. The fiber hoop according to claim 12 wherein the fiber hoop has a diameter of about 10 inches at the mandrel.

15. The fiber hoop according to claim 12 wherein the fiber hoop is secured to the wall by an epoxy.

16. The fiber hoop according to claim 12 wherein the fiber hoop is wrapped with tape wound through the opening and around top edges of the side guards.

17. The fiber hoop according to claim 12 wherein the mandrel is a curved mandrel having edges that raise up toward the side guards.

18. The fiber hoop according to claim 12 wherein the fiber coupler is a union connector.

19. A fiber hoop effective to hold wound strands of one or more fiber optic cables and be secured to an inside surface of a frame of a power generator, where the wound strands of the fiber optic cables include a sensor fiber optic cable having a sensor positioned within the generator frame and an analyzer fiber optic cable coupled to the sensor fiber optic cable and extending through a pressure sealed opening in the frame, said fiber hoop comprising a circular perimeter member including a circular opening therein, said circular perimeter member including a mandrel on which the strands of the one or more fiber optic cables are wound and opposing side guards on opposite sides of the mandrel where the mandrel is a curved mandrel having edges that raise up toward the side guards, wherein the fiber hoop is wrapped with tape wound through the opening and around top edges of the side guards, and wherein the sensor fiber cable and the analyzer fiber cable are coupled together by a fiber optical coupler and wherein the fiber coupler is secured to one of the side guards by tape such that the fiber coupler is held in a position that is raised above the wound strands.

* * * * *